US012694856B2

(12) United States Patent
    Girard et al.

(10) Patent No.: US 12,694,856 B2
(45) Date of Patent: Jul. 28, 2026

(54) CONTEXT-AWARE INPUT GESTURES FOR MUSIC CREATION APPLICATIONS

(71) Applicant: Avid Technology, Inc., Burlington, MA (US)

(72) Inventors: Sylvain Girard, Montréal (CA); Joseph Plazak, Verdun (CA)

(73) Assignee: Avid Technology, Inc., Burlington, MA (US)

( * ) Notice: Subject to any disclaimer, the term of this patent is extended or adjusted under 35 U.S.C. 154(b) by 903 days.

(21) Appl. No.: 18/062,711

(22) Filed: Dec. 7, 2022

(65) Prior Publication Data

US 2024/0194172 A1    Jun. 13, 2024

(51) Int. Cl.
    *G10H 1/00*       (2006.01)
    *G06F 3/0482*     (2013.01)
    *G06F 3/04886*    (2022.01)

(52) U.S. Cl.
    CPC ......... G10H 1/0025 (2013.01); G06F 3/0482 (2013.01); G06F 3/04886 (2013.01)

(58) Field of Classification Search
    CPC .. G10H 1/0025; G06F 3/0482; G06F 3/04886
    USPC ......................................................... 84/609
    See application file for complete search history.

(56) References Cited

U.S. PATENT DOCUMENTS

| | | | | | |
|---|---|---|---|---|---|
| 7,074,999 | B2 * | 7/2006 | Sitrick | ................. | G09B 15/023 |
| | | | | | 84/649 |
| 8,330,033 | B2 * | 12/2012 | Lengeling | ........... | G10H 1/0025 |
| | | | | | 84/645 |

| | | | | | |
|---|---|---|---|---|---|
| 8,686,962 | B2 * | 4/2014 | Christie | ................. | G11B 27/34 |
| | | | | | 345/173 |
| 9,690,382 | B1 * | 6/2017 | Moussette | ............... | G06F 3/167 |
| 11,264,002 | B2 * | 3/2022 | Ackerman | ........... | G11B 27/031 |
| 2010/0293455 | A1 * | 11/2010 | Bloch | .................. | G11B 27/031 |
| | | | | | 715/255 |
| 2012/0269344 | A1 * | 10/2012 | VanBuskirk | ............. | H04K 1/00 |
| | | | | | 380/255 |
| 2013/0275312 | A1 * | 10/2013 | Claman | ................ | G06Q 10/103 |
| | | | | | 705/301 |
| 2015/0268921 | A1 * | 9/2015 | Georges | ............... | G10H 1/0025 |
| | | | | | 700/94 |
| 2022/0310048 | A1 * | 9/2022 | Plazak | ................. | G10H 1/0025 |

(Continued)

FOREIGN PATENT DOCUMENTS

| | | | | | |
|---|---|---|---|---|---|
| JP | | 4211672 B2 * | 1/2009 | .......... | G10H 1/0008 |
| WO | WO-2013134443 A1 * | 9/2013 | ............. | G09B 15/02 |

*Primary Examiner* — Christina M Schreiber
(74) *Attorney, Agent, or Firm* — Oliver Strimpel

(57)              ABSTRACT

Music creation applications enable users to enter new objects into a musical project using gestures mediated by input maps that are adapted to the musical context of the object entry location. The musical context may be defined by an explicit aspect of the musical project or implicitly by notes or intervals already entered into the project. The adaptation of the input maps may include spatial scaling to provide greater space to objects favored by the context. The context-adapted input maps may be displayed and used to guide user input, such as with gestures on a touch screen. In some implementations, input-sensitive regions of input maps are scaled in accordance with the musical context without being displayed. The methods apply to musical object entry via pop-up input maps and virtual instrument displays.

23 Claims, 8 Drawing Sheets

(56) References Cited

U.S. PATENT DOCUMENTS

| | | | |
|---|---|---|---|
| 2023/0032765 A1* | 2/2023 | Plazak | ................ G06F 3/04817 |
| 2024/0194172 A1* | 6/2024 | Girard | .................. G06F 3/0482 |

* cited by examiner

CONTEXT-AWARE INPUT GESTURES FOR MUSIC CREATION APPLICATIONS

BACKGROUND

Entering items into a music project using an application such as a scorewriter or a digital audio workstation (DAW) constitutes the most time-consuming aspect for composers. In order to help ease the process, music creation applications often provide a touch screen interface in which users can enter musical items with the touch of a finger. However, such touch gestures are quite error-prone, which can force a user to back-track and re-enter an item more than once. One reason for the error-prone nature of existing touch interfaces is that the items to be selected are often physically close to each other on the touch display. This is especially the case when entering musical pitches and notes, where gestures involving small and precise movements of a finger can easily result in the addition or editing of the wrong item.

There is therefore a need to create user interfaces that improve the ease of selection of the correct musical item, thus speeding up the process of composition and improving the accuracy of the result.

SUMMARY

In general, music creation applications enable users to enter new objects into a musical project using gestures mediated by input maps that are adapted to the musical context of the object entry location.

In general, in a first aspect, a method of enabling a user of a music creation application to enter data into a musical project, comprises: retrieving a current musical context of a location in the musical project at which a new object is to be placed; generating an input map of a plurality of musical objects within a graphical user interface of the music creation application, wherein at least one of a layout and object content of the input map is based at least in part on the current musical context; enabling a user of the music creation application to select from the input map the new object to be entered at the location in the musical project; and in response to a selection by the user of the new object from the input map, entering the selected new object at the location within the musical project.

Various embodiments include one or more of the following features. A spatial scaling of the input map is based on the current musical context, such that objects favored by the current musical context are allocated more space in the input map than objects that are not favored by the current musical context. The spatial scaling of the input map is a spatial scaling of input-sensitive areas of the input map. Displaying the input map within the graphical user interface of the music creation application, wherein the input map comprises a virtual keyboard instrument, and the spatial scaling scales an area sensitive to at least one of a touch gesture and a drag gesture such that keys of the virtual keyboard representing notes that are favored by the current musical context are allocated a larger sensitive area than keys representing notes that are not favored by the current musical context. Displaying the input map within the graphical user interface of the music creation application, wherein the input map comprises a virtual keyboard instrument, and keys of the virtual keyboard are displayed with a graphical feature indicative of the current musical context. Displaying the input map within the graphical user interface of the music creation application, and wherein the input map is displayed with a default selection based on the current musical context. The new object is a note, and the default selection is a pitch of the note. The current musical context is explicitly associated with the musical project. The current musical context is determined by the music creation application by analyzing at least a portion of the musical project that has already been entered. The current musical context is a key of the musical project. The current musical context is a chord. The current musical context is based on diatonic intervals of notes that are already present within the musical project. The current musical context is based on pitches of notes that are already present within the musical project. The current musical context is based on objects present within a span of less than one of 3, 4, 5, and 6 measures of the musical project temporally preceding the location in the musical project at which the new object is to be placed. The user selection of the new object to be entered comprises: a selection of a first aspect of the new object from a first input map, wherein the first input map includes: a plurality of options for the first aspect of the new object, wherein the at least one of the layout and object content of the first input map is based on a first aspect of the current musical context; and a selection of a second aspect of the new object from a second input map, wherein the second input map includes: a plurality of options for the second aspect of the new object, and wherein at least one of the layout and object content of the second input map is based on a second aspect of the current musical context. The first aspect of the new object is a note duration, and the second aspect of the new object is a note pitch. Enabling the user to select from a second input map a modifier of the selected new musical object, wherein the second input map is based at least in part on the current musical context. The selection of the new object to be entered into the musical project involves a gesture by the user having a starting point on the input map, a drag movement within the input map, and a release point within the input map, and wherein an effect of at least one of the starting point, drag movement, and release point is based in part on the current musical context. The selection of the new object to be entered into the musical project involves a gesture by the user that ends with a release point within the input map, and wherein the music creation application performs error correction at the release point based in part on the current musical context. The user selection of the new object from the input map includes a drag motion from an initial selection within the input map to a final selection within the input map, and wherein the music creation application generates haptic feedback during the drag motion that favors user selection of objects favored by the current musical context. The music creation application determines the current musical context based in part on a prior object entry behavior of the user.

In general, in another aspect, a computer program product comprises: a non-transitory computer-readable medium with computer-readable instructions encoded thereon, wherein the computer-readable instructions, when processed by a processing device instruct the processing device to perform a method of enabling a user of a music creation application to enter data into a musical project, the method comprising: retrieving a current musical context of a location in the musical project at which a new object is to be placed; generating an input map of a plurality of musical objects within a graphical user interface of the music creation application, wherein at least one of a layout and object content of the input map is based at least in part on the current musical context; enabling a user of the music creation application to select from the input map the new object to be entered at the location in the musical project; and in response to a selection by the user of the new object from the input map, entering the selected new object at the location within the musical project.

In general, in a further aspect, a system comprises: a memory for storing computer-readable instructions; and a processor connected to the memory, wherein the processor, when executing the computer-readable instructions, causes the system to perform a method of enabling a user of a music creation application to enter data into a musical project, the method comprising, the method comprising: retrieving a current musical context of a location in the musical project at which a new object is to be placed; generating an input map of a plurality of musical objects within a graphical user interface of the music creation application, wherein at least one of a layout and object content of the input map is based at least in part on the current musical context; enabling a user of the music creation application to select from the input map the new object to be entered at the location in the musical project; and in response to a selection by the user of the new object from the input map, entering the selected new object at the location within the musical project.

DETAILED DESCRIPTION

The methods described herein are directed towards improving the ease and accuracy of user input to a media creation application. The embodiments described herein are applied to music creation applications, such as a scorewriter or a DAW, especially when they are being used to create a musical project. As used herein, a musical project refers to a musical composition that is represented within and stored by the music creation application on a digital computer system.

Figure 1:
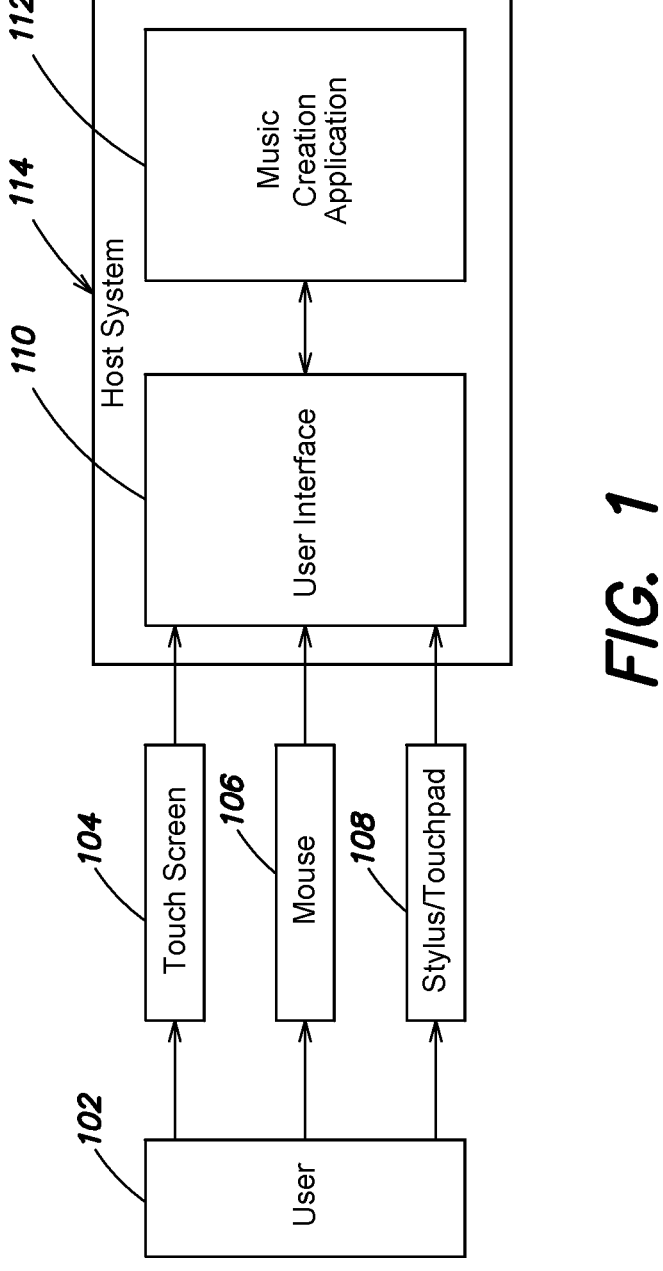
FIG. 1 is a high-level block diagram illustrating a system for context-aware gesture input to a music creation application.

FIG. 1 illustrates a system for context-aware gesture input to a music creation application. User 102 uses an input device, such as touch screen 104, mouse 106 or stylus/touchpad 108, to interact with user interface 110 of music creation application 112. The music creation application is hosted on system 114, which may be a standalone personal computer or workstation, a tablet or a smartphone, or a networked client with the application running remotely in the cloud.

When a user of a music creation application wishes to perform an action, the current state of the compositional process may determine which subsequent user actions are more likely to occur and which are less likely. This is especially the case when objects are being input to a music project. Within a given musical context, certain objects are more likely to be entered than others. The music creation application uses knowledge of the relationship between a given musical context and the likelihood that a particular object will be selected by the user as the next object for entry to a musical project to facilitate accurate and rapid entry of the object.

Gestures for music creation applications include a start, middle, and an end. The start is commonly referred to as the initial touch and specifies a starting selection for object entry gestures. The middle of a gesture, commonly referred to as a drag action, specifies a changing selection of the object to be entered. The end, or release of the gesture, specifies the final object to be entered. We describe herein methods of making each stage of a given gesture aware of the current musical context. Thus, for a given gesture, one or more of the initial touch, drag, and final release is made contextually aware.

Figure 2:
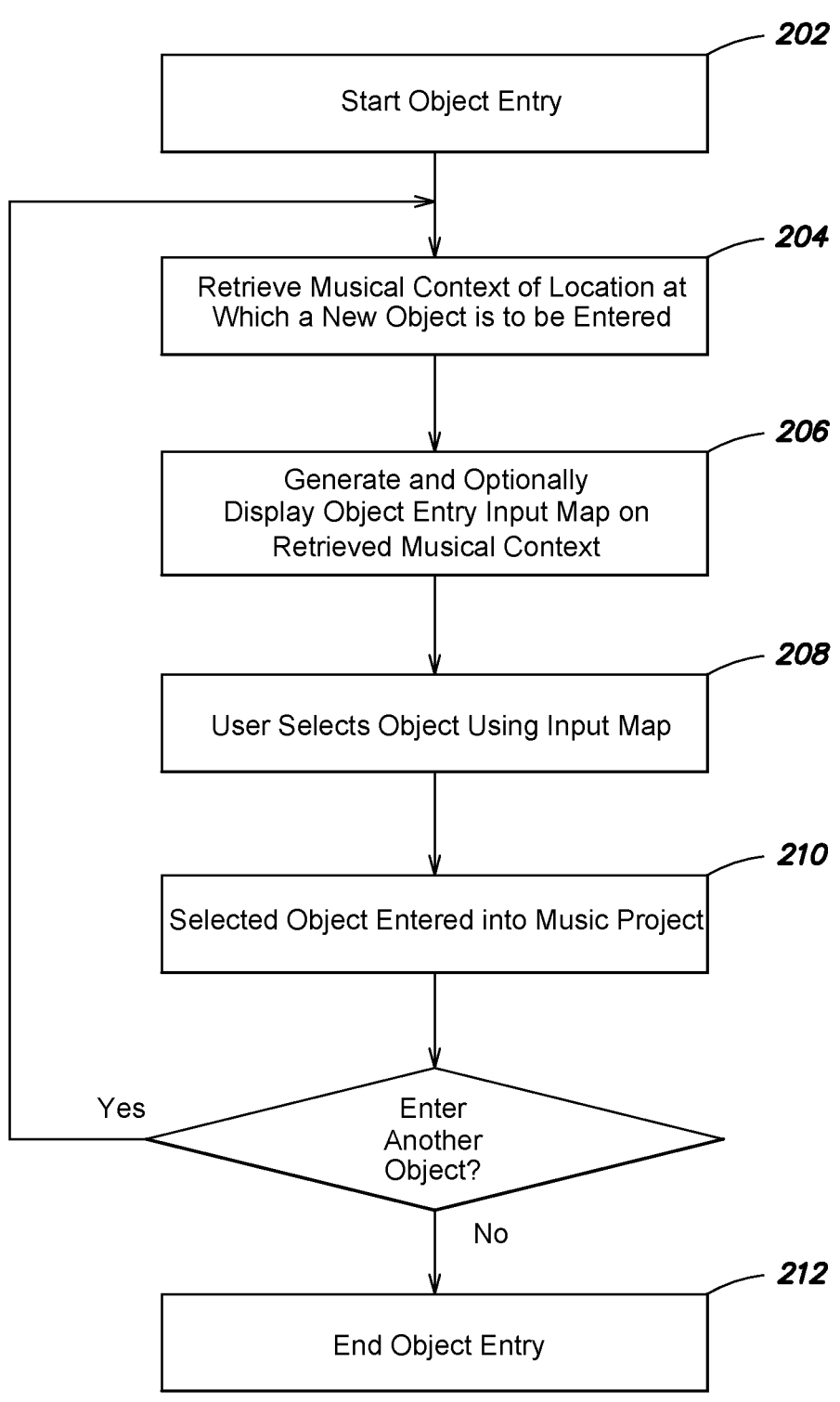
FIG. 2 is a high-level flow diagram illustrating steps involved in certain implementations of context-aware object entry.

FIG. 2 is a high-level flow diagram illustrating steps involved in certain implementations of context-aware object entry. In step 202, object entry is started on a music creation application. This generally occurs in response to a user command. In step 204, the music creation application retrieves the musical context of the location within the musical project being created at which a new object is to be entered. We describe various methods of defining the musical context below. In step 206, the music creation application generates and, in some embodiments, displays an input map on which the user is able to select an object to be entered into the musical project. In addition to, or as an alternative to a visual display, the input map may include musical-context-aware auditory and/or haptic feedback. The content and/or spatial layout of the input map is based in part on the retrieved musical context. Various implementations of step 206 are described below. In step 208, the user selects the object from the input map, and in step 210, the music creation application enters the selected object into the music project. As indicated in FIG. 2, if the user continues to enter objects into the musical project, steps 202 to 210 are repeated, until object entry is ended in step 212.

The musical context that is retrieved in step 204 may be the harmonic context of the object entry location. The harmonic context may be stored explicitly in association with or as part of the music project. For example, the harmonic context may be the overall key of the piece, or a key of a movement, section, shorter passage, or the most recent key change prior to the current object entry location. When the musical context is a key and the object to be entered is a note, the input map emphasizes notes of the diatonic scale of the key. Thus, for example, if the retrieved musical context is the key of C Major, the input map emphasizes the notes of the C Major scale, C, D, E, F, G, A, B, C, etc.

In certain implementations, the harmonic context is a chord associated with the measure in which the new object is to be entered. For example, if harmonic context is the chord of C Major, the input map emphasizes the notes C, E, and G.

For some musical projects, the harmonic context may be retrieved in explicit form by the music creation application. This occurs when the user specifies a key or a chord that is then stored as part of the music project. In other projects, the harmonic context is determined implicitly, such as by analyzing the notes of a passage of one or more measures surrounding the location of the new object entry. In various implementations, the objects within the 1, 2, 3, 4, or 5 measures of the musical project immediately preceding the new object entry location are used as the basis for a determination of the musical context of the entry location.

Another way of defining the local musical context is to base it on a first order or second order analysis of notes in one or more measures surrounding the entry location. In first order analysis, the set of notes used in these measures may be taken as the context and the notes emphasized for the new note selection consists of some or all of these notes. In second order analysis, the most likely transitions from a given pitch are taken as the context and notes emphasized for the new note selection consist of notes having the most likely transition from the note immediately preceding the entry location of the new note.

Various more sophisticated methods of determining the musical context may be based on modeling the portion of the project already entered. In some implementations, the musical context is based on a machine learning model that has been trained on a corpus of music previously composed by the user, or by a corpus of music defined by the genre of music to which the current musical project belongs, such as rock, jazz, or classical music.

The music creation application may enable the user to specify how the musical context is defined, for example by selecting one of the overall key, the "local" key, the current chord, the first-order set of notes, the second-order note transitions, or the intervals between notes. The application may make a default choice for the musical context definition. The default choice may be specified by the user or selected automatically by the application.

Various factors may be used to determine which of the musical context types discussed above are to be applied to an input gesture. These include the amount of data of the current musical project available and the explicit or implicit goals of the user. As a musical project progresses from empty to complete, the data affordances become more numerous. Whereas a project with one note cannot offer any second-order pitch transition information, a complete musical project provides sufficient data to enable detailed models of pitch transition data to be constructed. In some implementations, the music creation application enables the user to enter an explicit preference as to how musical context is to be determined. In other implementations the method of determining musical context is implicit, with the music creation application learning and adapting to the user's behavior so as to help a user work most efficiently. For example, when gestures are scaled based on the interval context of the portion of the musical project already entered, the system may detect an increase in user speed and/or accuracy. The system then continues to provide scaling based on this context until a better strategy is inferred from changed user behavior.

In step 206, an input map is generated. The layout and/or the content of the input map is determined in part by the retrieved musical context. In the described embodiments, the input map is a region of the graphical user interface of the music creation application that displays a representation of the various objects that the user may wish to select for entry at the current location within the musical project. The input map may pop up within the user interface of the music creation application when the application is in object entry model. In the most common use cases, the current location is the location of the next object to be entered at the end of the portion of the musical project that has already been entered. However, the user may specify any location within the project for object entry, such as by moving a cursor or clicking or tapping at the desired location.

In certain embodiments, the input map is not displayed. For example, an object entry touch gesture may be used to select a duration for a new note, while an invisible input map defines the sizes and locations of touch-screen areas mapped to each of the possible pitches for the new note. In this example, nothing appears on the screen, but the traveled distance of a finger from the initial touch location determines the selected pitch. Larger/wider regions of the touch screen are allocated to the pitches favored by the musical context, while other pitches are allocated smaller/narrower regions. This makes it easier for users to locate and select pitches favored by the context as compared to non-favored pitches. In one implementation, for a musical context of the chord of C Major, with an initial tap starting from C and dragging up, C and D are given a 5 mm range, while E is given a bigger 15 mm range because it is favored by the musical context. The user must drag further away to select an F rather than an E. A similar approach may be used when a mouse or stylus and pad are used for object entry.

Figure 3:
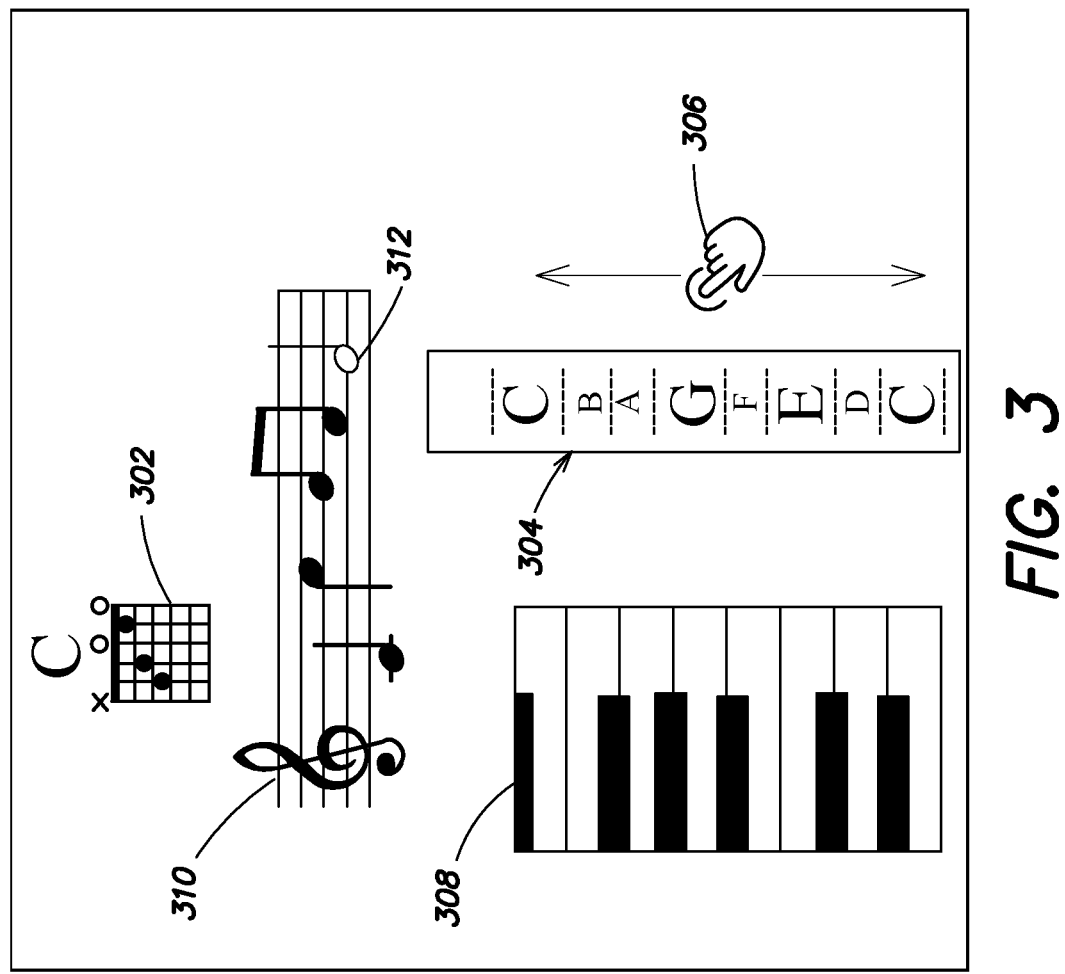
FIG. 3 is a diagrammatic illustration of a portion of the displayed user interface of a music creation application in note entry mode with a context-aware input map.

The input map is made reflective of the retrieved musical context in one or more of the following ways. The space allocated to an object in the map is scaled to devote more space to objects favored by the musical context and less space to objects that are disfavored. The font size, style, or color may be used to emphasize object choices deemed more probable in the musical context. FIG. 3 is a diagrammatic illustration of a portion of the displayed user interface of a music creation application in note entry mode. The figure shows a musical context of the chord of C major 302 and input map 304 that emphasizes notes of the C major chord by allocating more vertical spacing to the notes of the chord as well as by displaying the note names in a larger, bold font. The user enters a new note using touch gesture 306 by tapping the desired note on input map 304. The scaled map makes it quicker to locate the favored notes, and also reduces the chance of accidentally ending the input gesture on an erroneous note. In certain implementations, displayed keyboard 308 highlights the current selection. Stave 310 indicates the previously entered portion of the musical project, with tentative new note 312 indicating the current position of the user's gesture on input map 304. When the tap gesture is completed, new note 312 is entered into the music project (FIG. 2, step 210), and displayed accordingly in stave 310.

In the input map illustrated in FIG. 3, the favored notes are allocated a constant larger amount of space and the remaining notes are allocated a constant smaller amount of space. In various embodiments, the retrieved musical context provides a range of different likelihoods for the new object. For example, within the context of first-order note probabilities, gestural input space may be allocated based on prior occurrences of each pitch, such that commonly occurring pitches are easier to re-enter. Within the context of second-order probabilities, gesture space may be allocated based on transition (e.g., note interval) data that reveals the most likely note to occur after the preceding note. When such data is available to the application, the input map may be scaled linearly or non-linearly in accordance with the likelihoods. In the use case illustrated in FIG. 3, the vertical space allocated to a given note in the input map is scaled to reflect the likelihood that the given note will be selected. Thus, instead of the bimodal emphasis illustrated in input map 304, the emphasis would be multimodal, or scale continuously, with the allocated space being a function of the likelihood. This may be embodied in the input map by allocating an amount of space to each note in proportion to its probability of being selected for entry. Multimodal or continuous scaling may also be applied to other methods of object emphasis, such as font style and font color.

Figure 4:
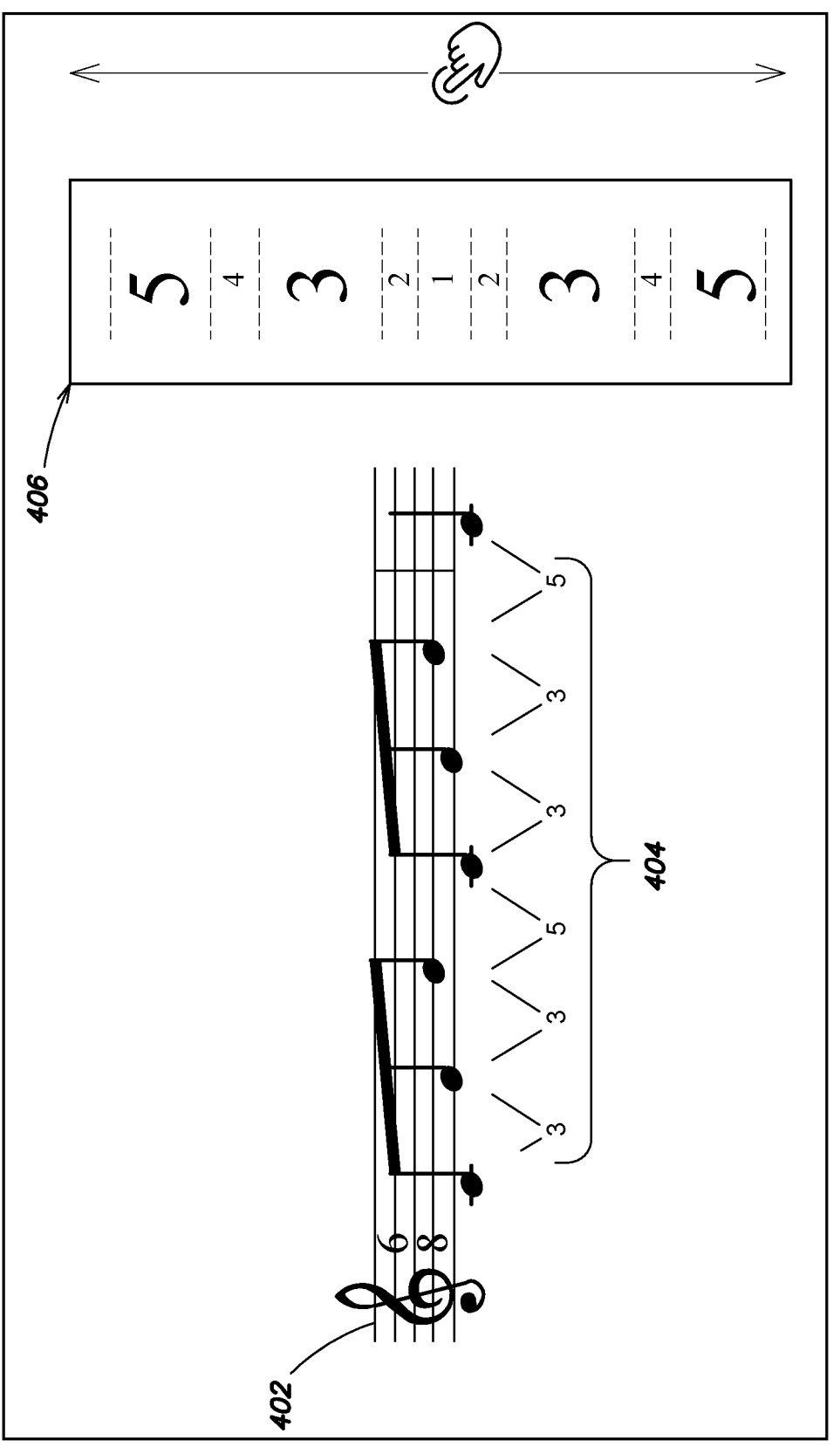
FIG. 4 illustrates the use of a note pitch interval context to define the local musical context and the corresponding context-aware input map.

FIG. 4 illustrates the use of a note pitch interval context to define the local musical context and the corresponding input map. Musical project 402 includes diatonic intervals 404 indicated between successive notes. The portion of project already entered contains the diatonic interval sequence: major third, major third, major fifth, major third, major third, and major fifth. Rather than provide note pitches as in the case illustrated in FIG. 3, context-aware input map 406 shows diatonic intervals with respect to the last-entered note, with the major third and major fifth intervals emphasized. The illustrated example shows the use of bimodal space allocation, font style (bold), and font size. As discussed above in connection with FIG. 3, when various interval likelihoods are provided by the retrieved musical context, the various forms of emphasis on the context-aware input map be multimodal or continuous.

Figure 5:
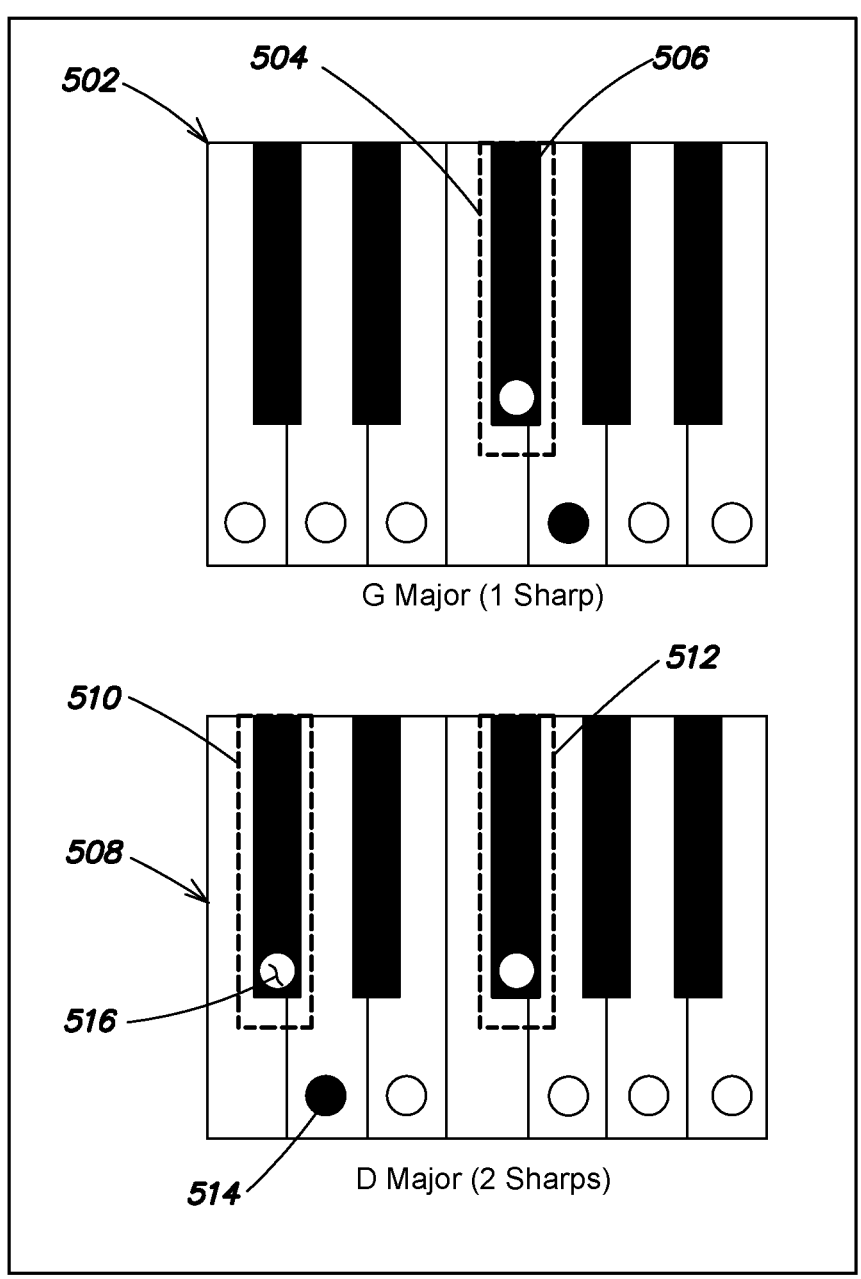
FIG. 5 illustrates context-aware scaling of input-sensitive zones on a virtual keyboard.

FIG. 5 illustrates another method of providing a context-aware input map. In this case, the input map is a virtual keyboard, with note entry gestures performed by tapping on the virtual keys. The input-sensitive zones of the on-screen keyboard are made context-aware, thus scaling in accordance with the note pitch likelihoods provided by the musical context. On-screen keyboard interface 502 illustrates the case when the retrieved musical context is the key of G major (one sharp). Dotted line 504 indicates the enlarged touch area surrounding F sharp key 506. Similarly, on-screen keyboard interface 508 indicates expanded touch areas 510 and 512 for the C sharp and F sharp keys respectively. In the case illustrated by the figure, the dotted lines are displayed, and the user is made explicitly aware of the input map scaling. In certain implementations, no indication of the expanded (or diminished) sensitive zones would be displayed so as not to distract the user. However, the context-aware scaling of the input zones still provides enhanced ease and accuracy of note entry for the note entry gesture. The virtual keyboard may also include a graphical feature emphasizing favored notes, such as black dot 514 indicating the tonic note and white dot 516 indicating a note forming part of the diatonic scale of the current key.

The scaling of the gesture input area independent of the graphical display of the input map may be used in other on-screen representations of musical instruments, such as a fretboard or drum pad interface.

Figure 6A:
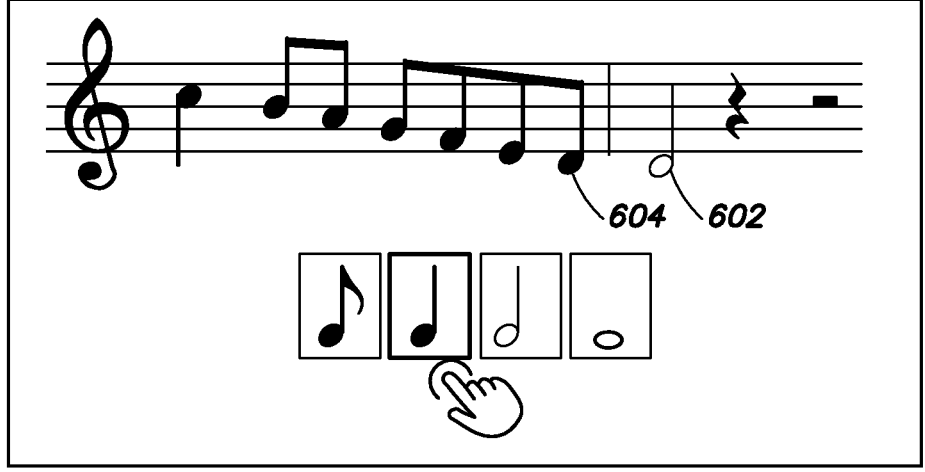
FIGS. 6A and 6B illustrate the use of musical context to determine a starting position for an object entry touch gesture.
Figure 6B:
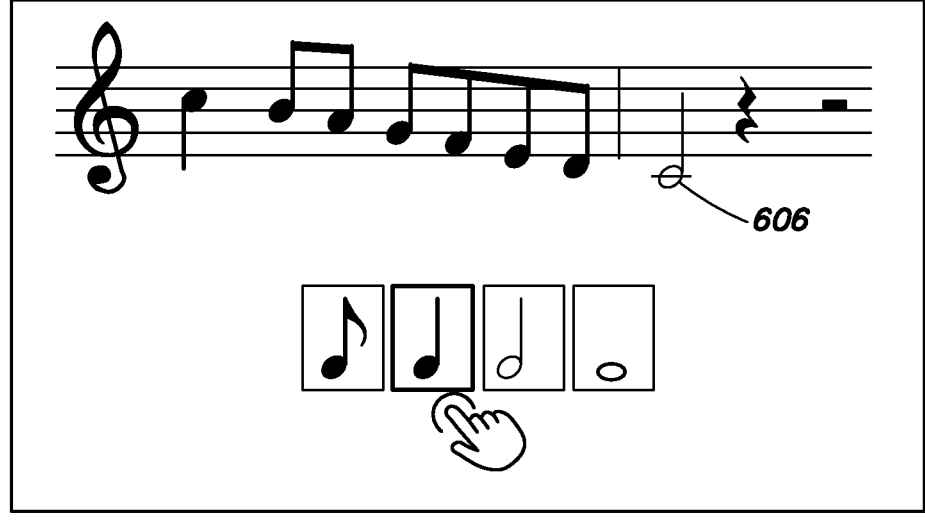

FIGS. 6A and 6B illustrate the use of the musical context to determine a starting position for an object entry touch gesture. For example, in the case of note entry, certain prior art systems use the note pitch of the note immediately preceding the new note entry location as the gesture starting position. This is shown in FIG. 6A in which starting position 602 of the gesture corresponds to previous note 604. By contrast, in FIG. 6B, initial input suggestion 606 is based on the musical context, thus facilitating the continuation of a musical idea. As described above in connection with FIGS. 3 and 4, if the user wishes to insert a note having a different pitch from the suggested initial position, a visible or invisible input map may be used in the subsequent portion of the gesture, such as by dragging a finger up or down on a touch screen.

Figure 7:
FIG. 7 illustrates a context-aware input map for the entry of modifiers of a musical object, such as articulations and rhythms.

In the examples illustrated in FIGS. 3-6, the new object being entered is a note. The described methods apply to the entry of other objects into a music creation application, including dynamic markers, phrasing, articulation, and rhythm. FIG. 7 illustrates a context-aware input map for the entry of modifiers of a musical object, such as articulations and note durations. The input-sensitive zones of the on-screen interface are scaled in accordance with the note duration likelihoods provided by the surrounding musical context. In input map 702, touch zones 704, 706, and 708 have been enlarged for the most commonly used durations so as to facilitate easier access to the rhythmic options most likely to be needed next within the given musical context. In the illustrated case, all note durations contained within current project 710 are enlarged. Rhythmic patterns may also be used to determine the current musical context. In the example shown in FIG. 7 where the user is about to append a note to the illustrated passage, the half-note duration may be further emphasized in the input map because each of the preceding 3 bars begins with a note of that duration. Similarly, the next note after that is expected to be a quarter note and may be further emphasized in the input map.

In the embodiments described above, the musical context is determined by a single facet of the musical project, i.e., the harmony, the pitches, the diatonic intervals, or the rhythm. In certain other embodiments, the musical context may be determined by multiple facets of the project. For example, the probabilities of pitch entry may be influenced by the duration of the note about to be entered. A longer duration note may have a higher probability of belonging to a current chord, whereas a shorter note may be a passing note that does not need to be part of the current chord. In this case, the input map for pitch is adapted to the context provided by the chord as well as the note duration selection. Thus, extending the example illustrated in FIG. 7, when a rhythm selection is made, a different context-aware pitch input gesture map is generated depending on the duration of the note selected on input map 702. This could be invisible to the user who knows that vertical dragging of the finger determines pitch, or it could be displayed within the user interface in response to selection of one of note durations 704, 706, or 708.

Figure 8:
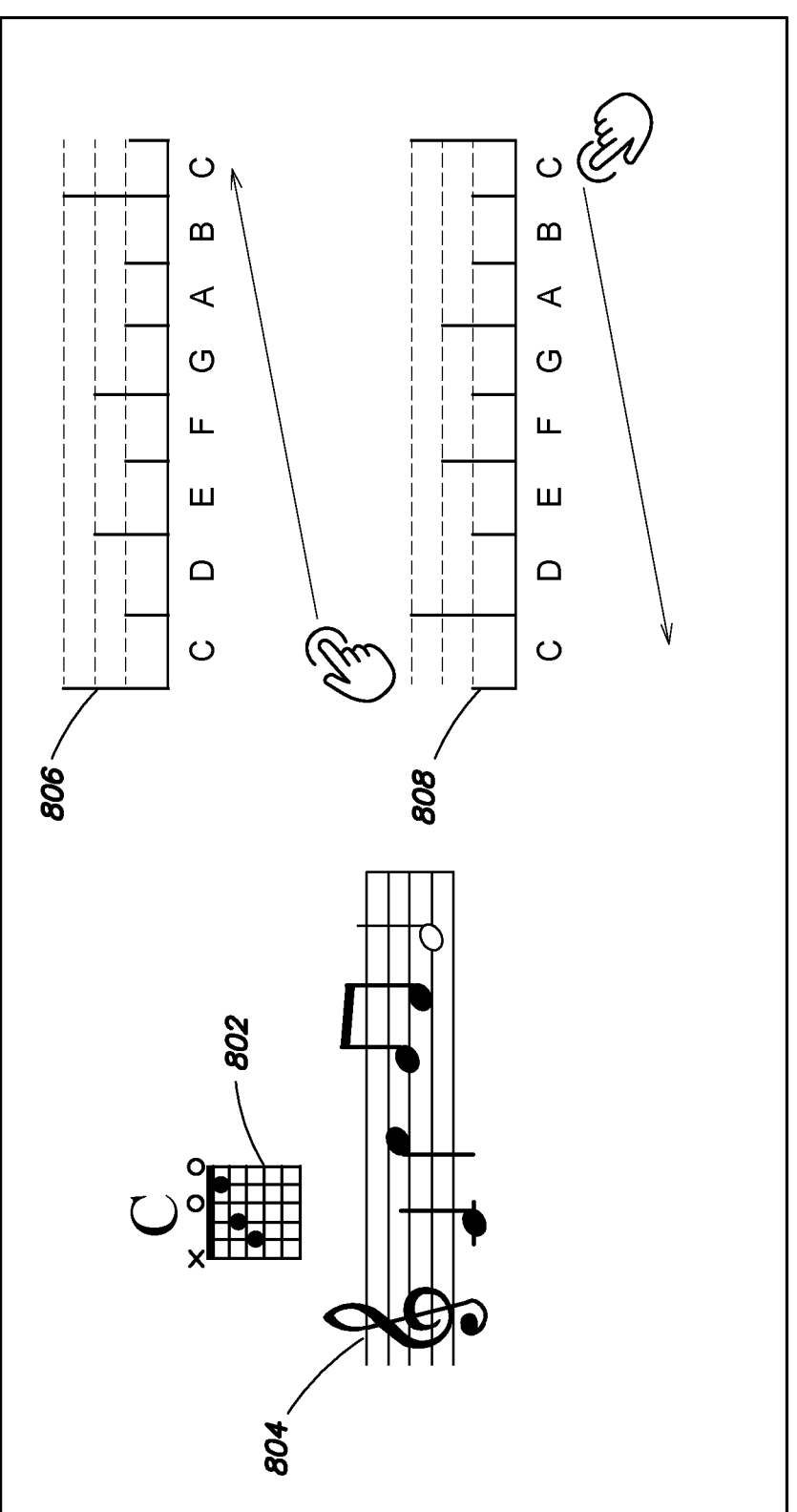
FIG. 8 illustrates the use of context-aware haptic feedback for entering a musical note.

Haptic feedback, such as the strength of a responsive vibration, may also be scaled in a context-aware manner. When a gesture is performed on a smooth surface, such as a touch screen, trackpad, or mouse pad, the surface provides no inherent tactile feedback for the user. The addition of haptic display can provide simulated tactile boundaries on a smooth surface, thereby providing an additional modality for users to orient themselves within an input gesture. Haptic feedback may be scaled via intensity and/or duration in order to make context-favored inputs more perceptually salient. FIG. 8 illustrates the use of context-aware haptic feedback. Musical context 802 (a C major harmony) and musical project 804 are shown at the left of the figure. Graphs 806 and 808 indicate vibro-tactile intensity along the y-axis. In the illustrated example, three levels of vibro-tactile intensity are used—low, medium, and high. The feedback is indicated by one or both of vibrational intensity and duration. Graph 806 depicts the strength of the simulated boundaries while performing an upward gesture. Arriving on the pitches which best fit the harmonic context, C, E, and G provide the most haptic feedback (C is both the key and the chord root, hence it receives additional emphasis). Graph 808 depicts the simulated boundaries within a downward gesture. Again, arriving on a simulated boundary that better fits the context is marked by stronger feedback. As indicated in the figure, the direction of movement affects where the appropriate feedback is placed.

The end of a gesture, especially a touch gesture, is known to be prone to error. As pressure is released from the input surface, physical touch area rapidly decreases in size from a relatively large area down to nothing. Depending on the position and angle of the input device when the touch event is completely terminated, a gesture can easily map to an erroneous endpoint. In some cases, users may learn to compensate for such end-of-gesture errors. One solution involves using a combination of gesture tracking and musical context to infer the most likely end point for a gesture. By recording the amount of time spent on probable and improbable input mappings during a gesture, a music creation application may obtain information as to whether or not the user is attempting to input something relatively probable or improbable. In addition, information from previous gestures may be used to infer whether a particular passage of the musical project is aiming for something probable or improbable. In ambiguous situations, this information may be used to choose the best mapping within the current musical context for the end of a touch gesture.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism. The system may be a mobile device, such as smartphone or a tablet.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of enabling a user of a music creation application to enter data into a musical project being created using the music creation application, the method comprising:
   using data from a portion of the musical project in a temporal vicinity of a location in the musical project at which a new object is to be placed to determine a current musical context;
   generating and displaying a first input map of a plurality of musical objects within a graphical user interface of the music creation application, wherein at least one of a layout and object content of the first input map is based at least in part on the current musical context;
   enabling a user of the music creation application to select from the first input map the new object to be entered at the location in the musical project; and
   in response to a selection by the user of the new object from the first input map, entering the selected new object at the location within the musical project and displaying the new object within the graphical user interface of the music creation application.

2. The method of claim 1, wherein a spatial scaling of the first input map is based on the current musical context, such that objects favored by the current musical context are allocated more space in the first input map than objects that are not favored by the current musical context.

3. The method of claim 2, wherein the spatial scaling of the first input map is a spatial scaling of input-sensitive areas of the first input map.

4. The method of claim 1, wherein the first input map comprises a virtual keyboard instrument, and a spatial scaling scales an area sensitive to at least one of a touch gesture and a drag gesture such that keys of the virtual keyboard representing notes that are favored by the current musical context are allocated a larger sensitive area than keys representing notes that are not favored by the current musical context.

5. The method of claim 1, wherein the first input map comprises a virtual keyboard instrument, and keys of the virtual keyboard are displayed with a graphical feature indicative of the current musical context.

6. The method of claim 1, wherein the first input map is displayed with a default selection based on the current musical context.

7. The method of claim 6, wherein the new object is a note, and the default selection is a pitch of the note.

8. The method of claim 1, wherein the current musical context is explicitly associated with the musical project.

9. The method of claim 1, wherein the current musical context is determined by the music creation application by analyzing at least a portion of the musical project that has already been entered.

10. The method of claim 1, wherein the current musical context is a key of the musical project in the temporal vicinity of the location of the musical project at which the new object is to be placed.

11. The method of claim 1, wherein the current musical context is a chord in the temporal vicinity of the location of the musical project at which the new object is to be placed.

12. The method of claim 1, wherein the current musical context is based on diatonic intervals of notes that are already present within the musical project in the temporal vicinity of the location of the musical project at which the new object is to be placed.

13. The method of claim 1, wherein the current musical context is based on pitches of notes that are already present within the musical project in the temporal vicinity of the location of the musical project at which the new object is to be placed.

14. The method of claim 1, wherein the temporal vicinity of the location of the musical project at which the new object is to be placed is a span of less than one of 3, 4, 5, and 6 measures of the musical project temporally preceding the location in the musical project at which the new object is to be placed.

15. The method of claim 1, wherein the user selection of the new object to be entered comprises:

a selection of a first aspect of the new object from the first input map, wherein the first input map includes:
a plurality of options for the first aspect of the new object, wherein the at least one of the layout and object content of the first input map is based on a first aspect of the current musical context; and
a selection of a second aspect of the new object from a second input map displayed within the graphical user interface of the music creation application, wherein the second input map includes:
a plurality of options for the second aspect of the new object, and wherein at least one of a layout and object content of the second input map is based on a second aspect of the current musical context.

16. The method of claim 15, wherein the first aspect of the new object is a note duration, and the second aspect of the new object is a note pitch.

17. The method of claim 1, further comprising enabling the user to select from a second input map a modifier of the new musical object, wherein the second input map is based at least in part on the current musical context.

18. The method of claim 1, wherein the selection of the new object to be entered into the musical project involves a gesture by the user having a starting point on the first input map, a drag movement within the first input map, and a release point within the first input map, and wherein an effect of at least one of the starting point, drag movement, and release point is based in part on the current musical context.

19. The method of claim 1, wherein the selection of the new object to be entered into the musical project involves a gesture by the user that ends with a release point within the first input map, and wherein the music creation application performs error correction at the release point based in part on the current musical context.

20. The method of claim 1, wherein the user selection of the new object from the first input map includes a drag motion from an initial selection within the first input map to a final selection within the first input map, and wherein the music creation application generates haptic feedback during the drag motion that favors user selection of objects favored by the current musical context.

21. The method of claim 1, wherein the music creation application determines the current musical context based in part on a prior object entry behavior of the user.

22. A computer program product comprising:
a non-transitory computer-readable medium with computer-readable instructions encoded thereon, wherein the computer-readable instructions, when processed by a processing device instruct the processing device to perform a method of enabling a user of a music creation application to enter data into a musical project, the method comprising:
using data from a portion of the musical project in a temporal vicinity of a location in the musical project at which a new object is to be placed to determine a current musical context;
generating and displaying an input map of a plurality of musical objects within a graphical user interface of the music creation application, wherein at least one of a layout and object content of the input map is based at least in part on the current musical context;
enabling a user of the music creation application to select from the input map the new object to be entered at the location in the musical project; and
in response to a selection by the user of the new object from the input map, entering the selected new object at the location within the musical project and displaying the new object within the graphical user interface of the music creation application.

23. A system comprising:
a memory for storing computer-readable instructions; and
a processor connected to the memory, wherein the processor, when executing the computer-readable instructions, causes the system to perform a method of enabling a user of a music creation application to enter data into a musical project, the method comprising:
using data from a portion of the musical project in a temporal vicinity of a location in the musical project at which a new object is to be placed to determine a current musical context;

generating and displaying an input map of a plurality of musical objects within a graphical user interface of the music creation application, wherein at least one of a layout and object content of the input map is based at least in part on the current musical context;

enabling a user of the music creation application to select from the input map the new object to be entered at the location in the musical project; and in response to a selection by the user of the new object from the input map, entering the selected new object at the location within the musical project and displaying the new object within the graphical user interface of the music creation application.

*     *     *     *     *